(12) United States Patent
Sheu

(10) Patent No.: US 8,909,058 B2
(45) Date of Patent: Dec. 9, 2014

(54) OPTICAL TRANSCEIVER SYSTEM

(75) Inventor: Yi-Zhong Sheu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 198 days.

(21) Appl. No.: 13/537,059

(22) Filed: Jun. 29, 2012

(65) Prior Publication Data

US 2013/0148969 A1    Jun. 13, 2013

(30) Foreign Application Priority Data

Dec. 7, 2011    (TW) .............................. 100145149 A

(51) Int. Cl.
*H04B 10/00*    (2013.01)

(52) U.S. Cl.
USPC ........................................ 398/139; 398/138

(58) Field of Classification Search
USPC .................................. 398/135–139
See application file for complete search history.

(56) References Cited

U.S. PATENT DOCUMENTS

| | | | | |
|---|---|---|---|---|
| 4,701,010 A * | 10/1987 | Roberts | ............................ | 385/31 |
| 4,824,200 A * | 4/1989 | Isono et al. | ...................... | 385/24 |
| 5,028,110 A * | 7/1991 | Plummer | ........................ | 385/42 |
| 5,479,547 A * | 12/1995 | Kunikane et al. | ............... | 385/47 |
| 5,854,700 A * | 12/1998 | Ota | .................................. | 398/60 |
| 6,044,187 A * | 3/2000 | Duck et al. | ....................... | 385/33 |
| 6,142,680 A * | 11/2000 | Kikuchi et al. | .................. | 385/93 |
| 6,198,864 B1 * | 3/2001 | Lemoff et al. | ................... | 385/47 |
| 6,370,296 B1 * | 4/2002 | Cao | ................................. | 385/24 |
| 6,571,033 B2 * | 5/2003 | Caracci et al. | .................. | 385/24 |
| 6,636,540 B2 * | 10/2003 | Uebbing | ........................... | 372/36 |
| 6,839,517 B2 * | 1/2005 | Anigbo et al. | ................... | 398/85 |
| 6,850,671 B2 * | 2/2005 | Carnevale et al. | ............... | 385/39 |
| 6,870,976 B2 * | 3/2005 | Chen et al. | ...................... | 385/14 |
| 6,888,988 B2 * | 5/2005 | Vancoille et al. | ............... | 385/47 |
| 6,954,592 B2 * | 10/2005 | Tan et al. | ....................... | 398/138 |
| 6,959,133 B2 * | 10/2005 | Vancoill et al. | ................. | 385/47 |
| 6,978,076 B2 * | 12/2005 | Kishida et al. | ................ | 385/140 |
| 7,013,069 B1 * | 3/2006 | He et al. | .......................... | 385/47 |
| 7,088,518 B2 * | 8/2006 | Tatum et al. | ................... | 359/634 |
| 7,149,375 B2 * | 12/2006 | Komiya et al. | ................. | 385/14 |
| 7,272,323 B2 * | 9/2007 | Grann et al. | ................... | 398/139 |
| 7,349,602 B2 * | 3/2008 | Panotopoulos | ................. | 385/47 |
| 7,444,047 B2 * | 10/2008 | Sonoda et al. | .................. | 385/33 |
| 7,450,858 B2 * | 11/2008 | Verdiell | ........................ | 398/164 |
| 7,492,992 B1 * | 2/2009 | Tyan et al. | ....................... | 385/45 |
| 7,869,671 B2 * | 1/2011 | Ishida et al. | .................... | 385/14 |
| 8,036,533 B2 * | 10/2011 | Hosomi et al. | .................. | 398/79 |
| 8,283,678 B2 * | 10/2012 | Morioka | ........................ | 257/82 |
| 8,335,411 B2 * | 12/2012 | Kuznia et al. | ................... | 385/33 |

(Continued)

*Primary Examiner* — Agustin Bello
(74) *Attorney, Agent, or Firm* — Novak Druce Connolly Bove + Quigg LLP

(57) ABSTRACT

An optical transceiver system includes a transmitter transmitting out a first light beam with a first wavelength, a receiver receiving a second light beam with a second wavelength; an optical fiber transmitting the first light beam and the second light beam; and a light guide member. The light guide member includes a lens block having a first side surface facing toward both the transmitter and the receiver, and a second side surface facing toward the optical fiber. A first lens portion and a second lens portion formed on the first side surface for optically coupling the respective transmitter and receiver, a third lens portion formed on the second side surface for optically coupling the optical fiber, and a wavelength divisional multiplexer embedded in the lens block. The wavelength divisional multiplexer receives and divides the first light beam and the second light beam.

4 Claims, 3 Drawing Sheets

(56) References Cited

U.S. PATENT DOCUMENTS

| | | | |
|---|---|---|---|
| 8,457,457 B2* | 6/2013 | Morioka | 385/33 |
| 8,483,571 B2* | 7/2013 | McColloch et al. | 398/141 |
| 8,503,838 B2* | 8/2013 | Chen | 385/31 |
| 8,540,437 B2* | 9/2013 | Lee et al. | 385/93 |
| 8,608,389 B2* | 12/2013 | Tamura et al. | 385/92 |
| 8,641,298 B2* | 2/2014 | Lim et al. | 385/92 |
| 2001/0053260 A1* | 12/2001 | Takizawa et al. | 385/14 |
| 2001/0053265 A1* | 12/2001 | Yamashita et al. | 385/48 |
| 2002/0110313 A1* | 8/2002 | Anigbo et al. | 385/24 |
| 2003/0063844 A1* | 4/2003 | Caracci et al. | 385/24 |
| 2003/0152336 A1* | 8/2003 | Gurevich et al. | 385/88 |
| 2003/0210866 A1* | 11/2003 | Kuhara et al. | 385/49 |
| 2003/0215240 A1* | 11/2003 | Grann et al. | 398/85 |
| 2004/0141710 A1* | 7/2004 | Kishida et al. | 385/140 |
| 2004/0208601 A1* | 10/2004 | Tan et al. | 398/135 |
| 2006/0245697 A1* | 11/2006 | Toillon et al. | 385/88 |
| 2007/0154142 A1* | 7/2007 | Tien | 385/37 |
| 2007/0280605 A1* | 12/2007 | Mendoza | 385/92 |
| 2008/0226228 A1* | 9/2008 | Tamura et al. | 385/33 |
| 2010/0086310 A1* | 4/2010 | Lee et al. | 398/138 |
| 2011/0058771 A1* | 3/2011 | Lee et al. | 385/33 |
| 2011/0097037 A1* | 4/2011 | Kuznia et al. | 385/33 |
| 2011/0142395 A1* | 6/2011 | Fortusini et al. | 385/37 |
| 2013/0148969 A1* | 6/2013 | Sheu | 398/79 |
| 2014/0099120 A1* | 4/2014 | Sorin et al. | 398/79 |

* cited by examiner

OPTICAL TRANSCEIVER SYSTEM

BACKGROUND

1. Technical Field

The present disclosure relates to an optical transceiver system.

2. Description of Related Art

Usually, in an optical transceiver system, plurality of optical fibers are needed for transmitting light beams from a transmitter, and for transmitting light beams back to a receiver, which makes the system complicated.

What is needed, therefore, is an optical transceiver system, which can overcome the above shortcomings.

BRIEF DESCRIPTION OF THE DRAWINGS

Many aspects of the present optical transceiver system can be better understood with reference to the following drawings. The components in the drawings are not necessarily drawn to scale, the emphasis instead being placed upon clearly illustrating the principles of the present optical transceiver system. Moreover, in the drawings, like reference numerals designate corresponding parts throughout the several views.

DETAILED DESCRIPTION

Embodiments of the present disclosure will now be described in detail below and with reference to the drawings.

Figure 1:
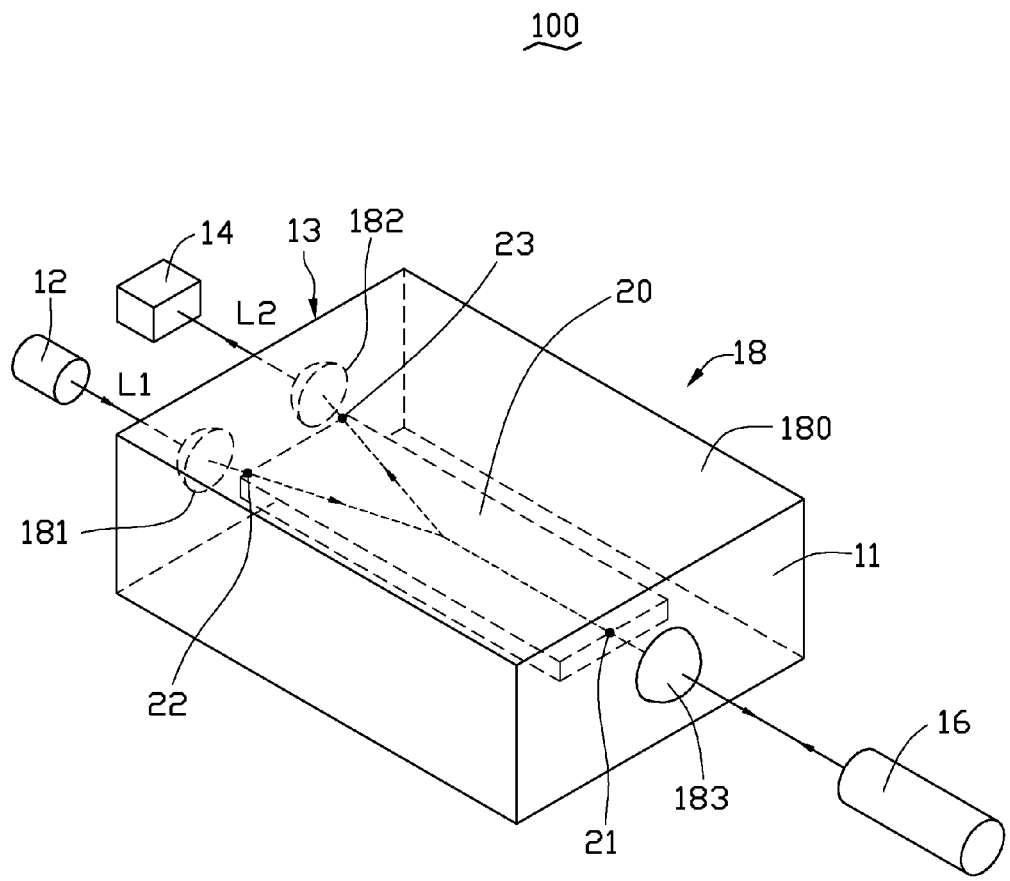
FIG. 1 is a schematic view of an optical transceiver system in accordance with a first embodiment.

FIG. 1, is an optical transceiver system 100 in accordance with a first embodiment. The optical transceiver system 100 includes a transmitter 12, a receiver 14, a single optical fiber 16, and a light guide member 18.

The transmitter 12 and the receiver 14 are arranged at a same first side of the light guide member 18, and the optical fiber 16 is arranged at an opposite second side of the light guide member 18. The transmitter 12 may include one or more laser diodes and modulators for modulating light wave emitted from the laser diodes according to electrical signals need to be uploaded, and the receiver 14 may include one or more photoelectric converters, such as photodiodes for receiving and converting light signals to electrical signals. The transmitter 12 is configured for emitting a first light beam L1. The receiver 14 is configured for receiving a second light beam L2. The direction of the first light beam L1 is reversed to the direction of the second light beam L2. A wavelength of the first light beam L1 is different from the wavelength of the second light beam L2, for example, the wavelength of the first light beam L1 may be 1300 nm, and the wavelength of the first light beam L2 may be 1550 nm. Both of the first light beam L1 and the second light beam L2 may carry electrical signals, for example, both of the first light beam L1 and the second light beam L2 may be modulated light in response to electrical signals.

The light guide member 18 includes a lens block 180 having the first side surface 13 and the second side surface 11, a first lens portion 181, a second lens portion 182, a third lens portion 183 and a wavelength divisional multiplexer 20. The lens block 180 is made of transparent materials and may be in a rectangular shape. The first side surface 13 is parallel with the second side surface 11. The first and second lens portions 181, 182 are formed on the first side surface 13, and the third lens portion 183 is formed on the second side surface 11. The first and second lens portions 181, 182 are aligned with the respective transmitter 12 and receiver 14, and the third lens portion 183 is aligned with the optical fiber 16. In the present embodiment, each first side surface 13 and second side surface 11 is a planar surface, and each first, second and third lens portions 181, 182 and 183 is a convex lens integrally formed with the lens block 180.

The wavelength divisional multiplexer 20 is embedded in the lens block 180, and can be integrally formed with the lens block 180 by insert molding. The wavelength divisional multiplexer 20 is configured for dividing the first light beam L1 and the second light beam L2 according to different wavelengths of the first and second light beams L1, L2. Both of the first light beam L1 and the second light beam L2 are transmitted in the optical fiber 16. In detail, see the arrows in the drawing, the first light beam L1 emitted by the transmitter 12 enters into the first lens portion 181, then the wavelength divisional multiplexer 20 receives the first light beam L1 from the first lens portion 181 and guides the first light beam L1 to the third lens portion 183, next the third lens portion 183 converges the first light beam L1 to the optical fiber 16. The second light beam L2 transmitted out from the optical fiber 16 enters the third lens portion 183, then the wavelength divisional multiplexer 20 receives the second light beam L2 from the third lens portion 183 and guides the second light beam L2 to the second lens portion 182, next the second lens portion 182 converges the second light beam L2 to the receiver 14, and the receiver 14 can convert the light signals to electrical signals.

The wavelength divisional multiplexer 20 may be a planar light wave circuit splitter (PLC splitter), such as waveguide grating, dense wavelength division multiplexer, 1×N splitter and bi-directional wavelength division multiplexer, which are capable of dividing light beams according to different wavelengths. In the present embodiment, the wavelength divisional multiplexer 20 is a 1×2 splitter, which defines a first port 22 at a light path of the first light beam L1 from the first lens portion 181, a second port 23 at a light path of the second light beam L2 to the second lens portion 182, and a third port 21 at a light path of the light from/to the third lens portion 183. In the present embodiment, light paths in the wavelength divisional multiplexer 20 substantially form a Y type, that is, the first light beam L1 exiting from the first port 22 and the second light beam L2 transmitting toward the second port 23 form an included angle.

Figure 2:
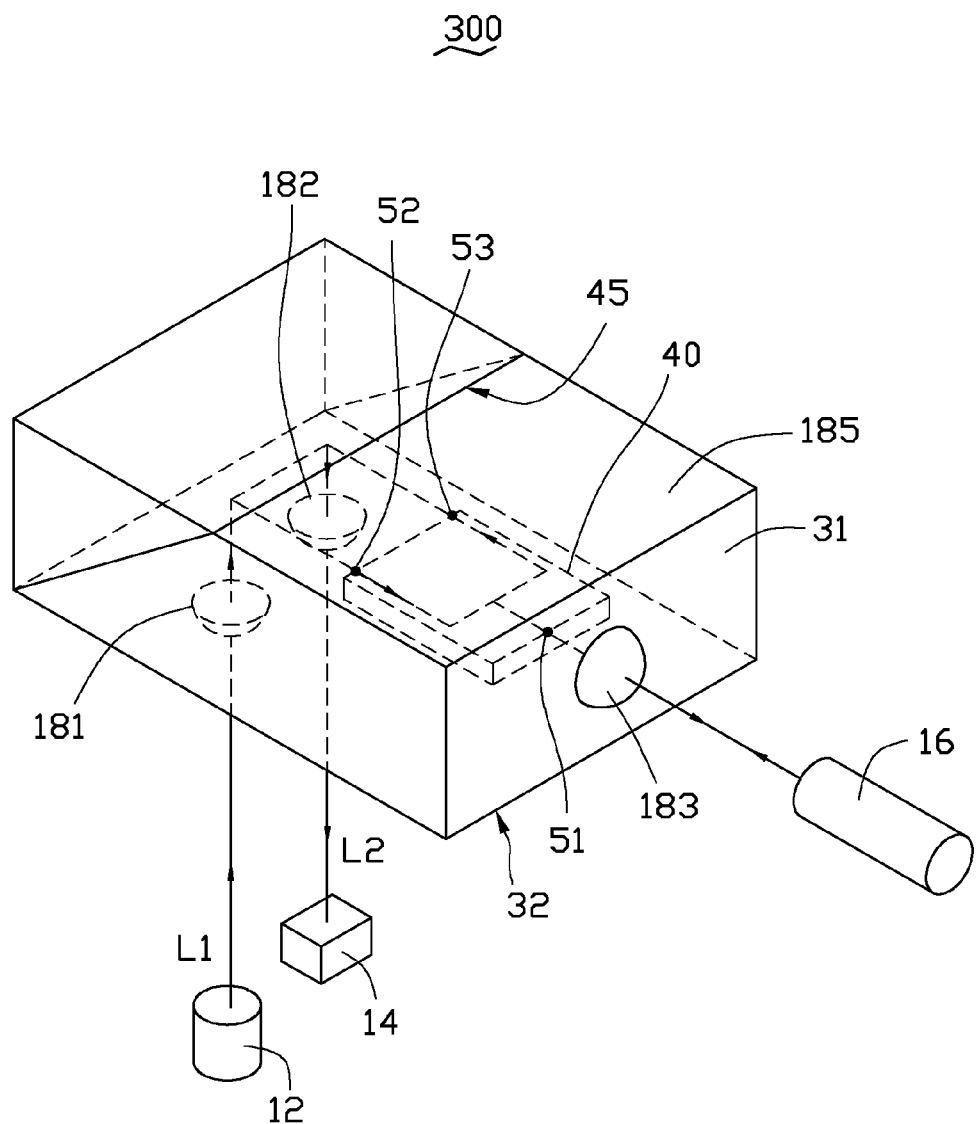
FIG. 2 is a schematic view of an optical transceiver system in accordance with a second embodiment.

FIG. 2 is an optical transceiver system 300 in accordance with a second embodiment. Main differences from the optical transceiver system 100 are, the first lens portion 181 and the second lens portion 182 are formed on a bottom surface 32 of the block 185, and the block 185 includes an inner reflecting surface 45. The bottom surface 32 is perpendicular to the first side surface 31 where the third lens portion 183 is located. The inner reflecting surface 45 is 45 degrees slanted relative to the bottom surface 32 and the first side surface 31, and is a flat surface having a metallic layer, such as a silver layer. Due to the inner reflecting surface 45, light paths of the first and second light beams L1, L2 are refracted about 90 degrees. The wavelength divisional multiplexer 40 is a PLC splitter having a first port 52 at a light path of the first light beam L1 from the inner reflecting surface 45, a second port 53 at a light path of the second light beam L2 to the inner reflecting surface 45, and a third port 51 at a light path of the light from/to the optical fiber 16. In the present embodiment, the light paths in the wavelength divisional multiplexer 40 are parallel with each other, i.e., the first light beam L1 exiting from the first port 52 is parallel with the second light beam L2 transmitting toward the second port 53.

Figure 3:
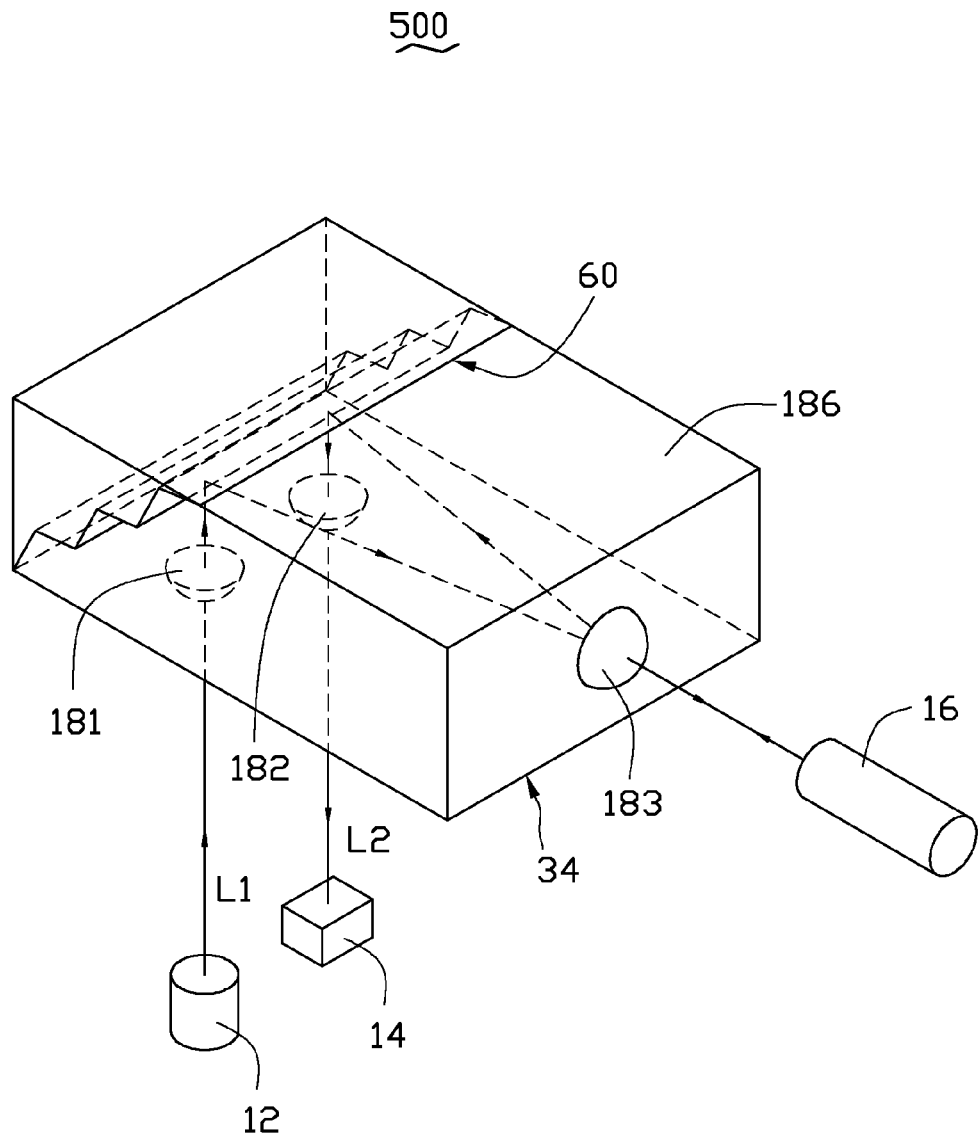
FIG. 3 is a schematic view of an optical transceiver system in accordance with a third embodiment.

FIG. 3 is an optical transceiver system 500 in accordance with a third embodiment. The main differences from the optical transceiver system 300 are, the block 186 has an inner reflecting surface 60 having convex and concave microstructures cooperatively serving as the wavelength divisional multiplexer, whereby a PLC splitter is avoided. The inner reflecting surface 60 is also slanted 45 degrees relative to the bottom surface 34. The convex microstructure is alternated to the concave microstructure, and each of the convex microstructure and the concave microstructure extend along a lengthwise direction of the inner reflecting surface 60. The convex microstructure is configured for receiving the first light beam L1 and reflecting the first light beam L1 to the third lens portion 183, and the concave microstructure is configured for receiving the second light beam L2 and reflecting the second light beam L2 to the second lens portion 182. Metallic layers can be formed on the convex and concave microstructures to enhance the reflection, and a refraction index of the inner reflecting surface 60 is greater than the block 186, whereby the first light beam L1 and the second light beam L2 can be fully reflected at the inner reflecting surface 60.

In other embodiments, the wavelength divisional multiplexer may be plurality of thin film filters incorporated with at least one reflector, in which one light beam is filtered out from one thin film filter, and the other light beam is first reflected by a reflector and then is filtered out from the other one thin film filter.

The above-described optical transceiver systems use a light guide member having a wavelength division function. Such a light guide member is an integrated member and thus is compact. Due to the light guide member, light can be divided according to different wavelengths at the end facing toward the transmitter and the receiver, and can be coupled together at the end facing toward a single optical fiber, whereby only a single optical fiber is needed.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical transceiver system, comprising:
   a transmitter configured for emitting a first light beam with a first wavelength;
   a receiver configured for receiving a second light beam with a second wavelength;
   an optical fiber configured for transmitting the first light beam and the second light beam; and
   a light guide member comprising a lens block having a first side surface facing toward both the transmitter and the receiver, a second side surface facing toward the optical fiber and perpendicular to the first side surface, and an inner reflecting surface 45 degrees slanted relative to each of the first side surface and the second side surface, a first lens portion formed on the first side surface and optically coupling the transmitter, a second lens portion formed on the first side surface and optically coupling the receiver, a third lens portion formed on the second side surface and optically coupling the optical fiber, and a wavelength divisional multiplexer embedded in the lens block, the wavelength divisional multiplexer configured for transmitting the first light beam from the transmitter to the optical fiber and transmitting the second light beam from the optical fiber to the receiver, wherein the wavelength divisional multiplexer is a planar lightwave circuit splitter and comprises a first port and a second port facing toward the inner reflecting surface, and a third port optically coupled to the third lens portion, and the second light beam transmitting toward the second port is parallel with the first light beam exiting from the first port.

2. The optical transceiver system of claim 1, wherein the first lens portion, the second lens portion and the third lens portion are integrally formed with the lens block, and each of the first lens portion, the second lens portion and the third lens portion is a convex lens.

3. The optical transceiver system of claim 1, wherein the inner reflecting surface is a flat surface having a metallic layer.

4. The optical transceiver system of claim 1, wherein both of the first light beam and the second light beam are modulated light in response to electrical signals.

* * * * *